United States Patent Office 3,277,320
Patented Oct. 4, 1966

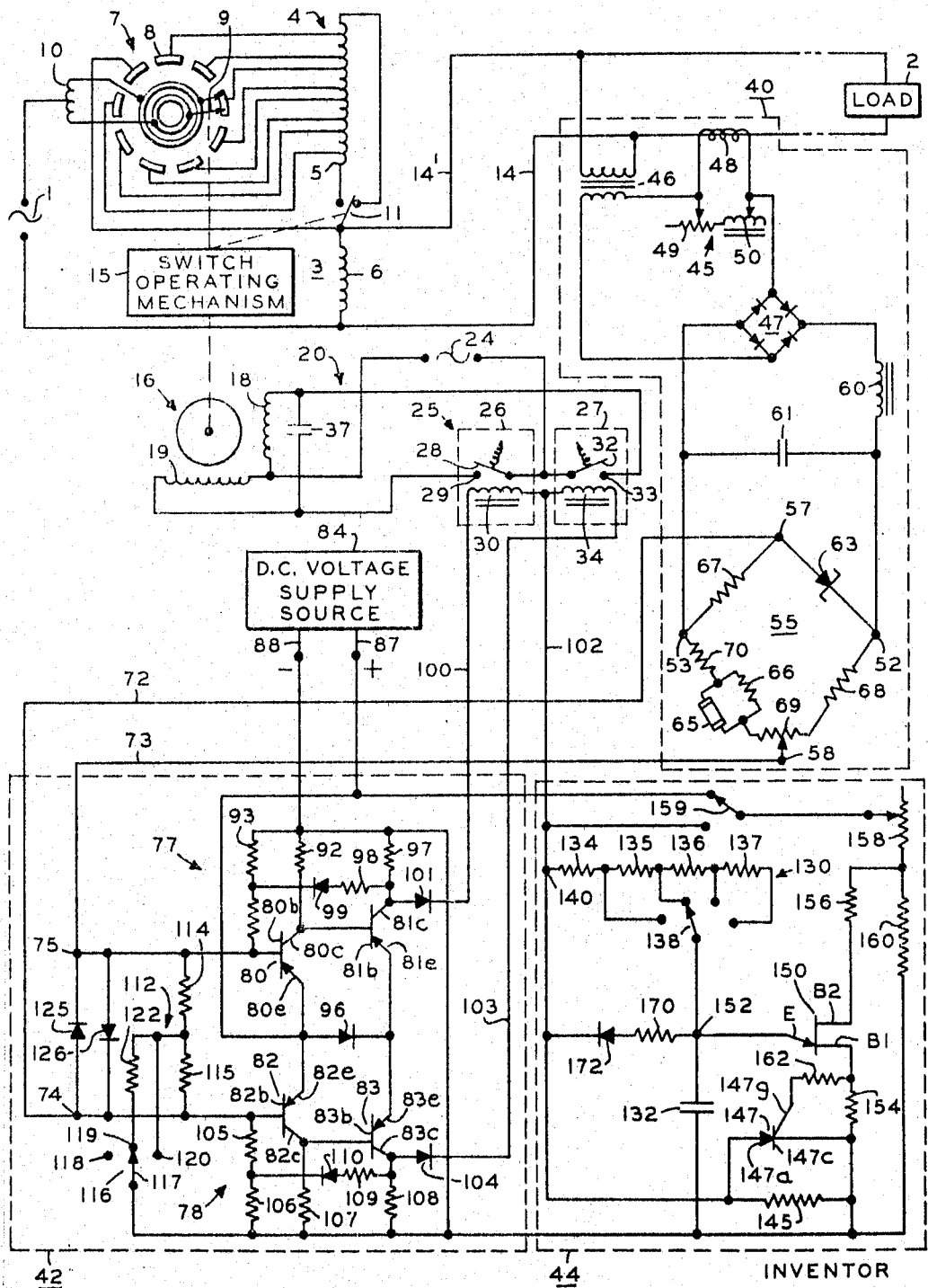

3,277,320
TIME DELAY CIRCUIT
Leonard E. Conner, St. Louis, Mo., assignor to Wagner Electric Corporation, St. Louis, Mo., a corporation of Delaware
Original application Nov. 21, 1962, Ser. No. 239,155. Divided and this application Sept. 30, 1965, Ser. No. 491,715
7 Claims. (Cl. 307—141)

This is a division of co-pending application Ser. No. 239,155, filed Nov. 21, 1962, the Electrical Control System.

This invention relates to electrical control systems and more particularly to a condition responsive control system for controlling the operation of an electrical device in accordance with changes in a variable condition. One useful application of the present invention is in voltage control systems, such as step type voltage regulators utilizing a transformer tap changing apparatus, although many other applications are possible.

In a transformer tap changing voltage regulator, the tap-selecting switch is usually actuated by a mechanical driving mechanism driven by a reversible electric motor. The motor is energized to effect tap changes in response to variations in the system voltage in a manner to maintain the system or load voltage substantially constant or within a relatively small range of values.

Various types of control systems for controlling the operation of a tap-changing motor have been used in the past. In many such systems, contact making voltmeters and relays, and other mechanically operating devices, were used to sense voltage changes in the system and control the tap changer. Such systems usually included a pair of mechanical time delay devices, such as slow-moving electric motor timers, or time-delay thermo-sensitive contact making elements, such as bimetallic strips, in order to prevent the operation of the tap changer in either direction upon the occurrence of minor or short time changes in the system voltage, and thus avoid needless tap changes. The mechanical devices in such systems are subject to mechanical fatigue, arcing and wear at contacts, bearing wear, and, in general, mechanical failure. While many types of tap-changing control systems have been used in the past, they have usually been complicated and expensive, required frequent inspection and repair, or had the above-mentioned objectionable features.

A general object of the present invention is to provide a new and improved condition responsive control system.

Another object of the present invention is to provide an improved electrical control system utilizing static components whereby the above-mentioned objectionable features are greatly reduced or obviated.

Another object is to provide a new and improved condition responsive control apparatus utilizing static components and wherein the apparatus is of light weight and not readily subject to damage by vibrations and the like.

Another object is to provide a voltage regulating system employing new and improved transistorized condition responsive control means.

Another object is to provide an automatically controlled transformer tap-changing system having a relatively simple and economical condition responsive control apparatus incorporating improved time delay means.

Another object is to provide in a voltage regulating system condition responsive control means having a novel polarity sensitive switching circuit and a time delay circuit.

Another object is to provide a step type voltage regulating system employing novel condition responsive control means incorporating time delay means wherein static circuit components are utilized.

Another object is to provide a novel condition responsive circuit having a pair of outputs for selectively operating a pair of electrical control means and wherein a single delay circuit responsive to the outputs of the condition responsive means is employed to predeterminately delay the operation of either of the control means.

Another object is to provide a novel time delay network utilizing static components.

Still another object is to provide in an electrical control system novel current controlled, as distinguished from voltage controlled, condition responsive control means for effecting the operation of current responsive means for different modes of operation.

The above and other objects and advantages of the present invention will become apparent from the following description and accompanying drawing which is a schematic diagram of a voltage regulating system embodying the present invention.

Briefly, in accordance with one aspect of the present invention, a condition responsive electrical control system is provided which includes a sensing circuit for providing a signal which is reversible in polarity in accordance with changes in an electrical condition, a static polarity switching circuit controlled in response to the reversible signal for selectively operating electric control means for different modes of operation, and a static time delay circuit responsive to the output of the switching circuit for delaying the operation of the control means. The invention also consists in the parts and arrangement and combination of parts hereinafter described and claimed.

Referring now to the drawing, the numeral 1 designates an alternating current supply source which is connected to supply power to a load 2, the voltage of which is to be controlled or regulated independently of the voltage of supply source 1. This regulation is effected by a regulator, indicated generally at 3, which is shown as a step voltage regulator of the tap-changing type. Regulator 3 includes an auto-transformer 4 having a series tapped winding 5 and a shunt winding 6 inductively coupled with winding 5, and a dial type tap-selecting switch 7 having a plurality of stationary contacts 8 respectively connected to taps on winding 5, and a pair of movable contacts 9 engageable with the stationary contacts. The movable contacts 9 are connected through a conventional reactor or protective autotransformer 10 to one side of supply source 1. The other side of the supply source is connected to one side of shunt winding 6, and the other side of winding 6 is connected to one or the other of the opposite ends of tapped winding 5 through a reversing switch 11. As is well known, by using a reversing switch, such as switch 11, the regulator can be operated so that the distribution circuit voltage is higher or lower than the supply voltage. The shunt winding 6 is connected across a distribution circuit, including leads 14 and 14', to which load 2 is connected.

The tap-selecting switch 7 is operated by a suitable switch operating mechanism, indicated in block form at 15, which, in turn, is driven by a reversible electric motor 16. Any suitable mechanical operating mechanism which insures that the movable contacts 9 are always stopped in a position in which each is in engagement with a stationary contact of the switch may be utilized and various types of such switch operating mechanisms for this purpose are well known in the art. The mechanism 15 and motor 16 may also be used to suitably operate the reversing switch 11 through mechanism 15.

The motor 16 is illustrated as a conventional capacitor start and run induction motor having a pair of stator windings 18 and 19 connected in a motor control circuit 20 having a suitable alternating current supply source indicated at 24. In order to energize motor 16 and selectively control the direction of rotation of the motor, motor operating means, indicated generally at 25 in the drawing, are shown including a pair of motor control relays 26 and 27. Relay 26 has a movable contact 28 engageable with a fixed contact 29, and a relay operating coil 30. Similarly, relay 27 includes a movable contact 32, an associated fixed contact 33, and a relay coil 34. The associated contacts of each relay are normally biased to their open position but are closed when the coil associated therewith is energized. The two movable contacts 28 and 32 of the relays are connected together and to one side of the supply source 24, while the other side of the source 24 is connected to a common junction of the two stator windings 18 and 19. The end of winding 18 opposite the common junction is connected to one end of a motor capacitor 37 and to fixed contact 33; and the end of winding 19 opposite the common junction is connected to the other end of capacitor 37 and to stationary contact 29. The motor capacitor, as is well known, effects a phase displacement of the motor currents for starting purposes. It will be assumed herein that when the contacts of relay 26 are closed the motor is energized and rotates in a direction to move tap-selecting contacts 9 in a clockwise direction (as viewed in the drawing) to raise the distribution circuit voltage, while the closing of the contacts of relay 27 effects energization of motor 16 in the opposite direction to move the contacts 9 in a counterclockwise direction to lower the distribution circuit voltage.

By suitably controlling the operation of motor 16, as by selectively energizing relays 26 and 27 in accordance with changes in the voltage of the distribution or load circuit, the regulator 3 will provide voltage "boosting" or "bucking" effects to compensate for such voltage changes and thereby maintain the load voltage substantially constant or within a predetermined small range of values. For this purpose, there is provided a condition responsive control system including a condition sensing circuit, indicated generally at 40, for deriving a signal responsive to variations in the load voltage from a predetermined desired value, a switching circuit 42 for selectively energizing the motor control relays 26 and 27 in response to the output of circuit 40, and a delay network 44 for delaying the energization of either of the relays a predetermined length of time after the switching circuit has been operated.

Considering the control system in greater detail, the sensing circuit 40 includes a conventional line drop compensating circuit 45 connected in series with the secondary winding of a potential transformer 46 having its primary winding connected across the distribution circuit, and the A.C. input terminals of a full wave rectifier 47. The line drop compensating circuit 45 is shown for illustration as including a current transformer 48 connected in series in the distribution circuit 14–14′ for circulating a current proportional to the load current through a series circuit including an adjustable resistor 49 and an adjustable reactor 50. By adjusting the values of the resistor and reactor, voltages proportional to the resistive and reactance drops in the line are provided across the current transformer secondary. The voltage across the secondary winding of transformer 46, which is proportional to the voltage of the distribution circuit at a pre-selected point therein, is combined with the voltage of the line drop compensating circuit by its series connection therewith to provide, at the A.C. terminals of rectifier 47, an alternating voltage proportional to the voltage across the load 2, which load may be connected at a considerable distance from the regulator or potential transformer 46.

The D.C. output terminals of rectifier 47 are connected to the input circuit terminals, indicated at 52 and 53, of a bridge detector circuit 55 having a pair of output circuit terminals 57 and 58. The rectifier 47 thus impresses a D.C. voltage proportion to the voltage at the load 2 across the input terminals 52 and 53 of the detector 55. A filter network including a choke 60 connected in series between the rectifier 47 and the detector, and a capacitor 61 connected across the input to the detector, serves to smooth out the full-wave rectified current output of the rectifier.

Detector circuit 55 is shown as a four-arm bridge circuit having, in one arm, a voltage breakdown device, such as a silicon diode 63 having a sharp inverse voltage breakdown characteristic. Such a device is commonly referred to as a "Zener" diode which, when operated at a voltage above its critical or Zener breakdown voltage point on its characteristic curve, acts as a non-linear resistance having a constant voltage drop thereacross even though the current through the diode varies. The Zener diode 63 thus provides a reference voltage for the detector bridge.

The characteristics of Zener diodes are somewhat affected by temperature changes, the voltage across the diode varying with changes in its temperature. The effects of varying temperatures on Zener diodes increase as the designed voltage rating of the diodes is increased. Generally, the voltage drop across a Zener diode operating at more than 5 volts increases with an increase in the temperature thereof. By employing a plurality of series connected diodes of low voltage rating, the effects of temperature changes can be substantially obviated. However, a relatively large number of series connected Zener diodes for a particular design may not be nearly as economical as the use of temperature compensating means and one or a few diodes having a higher voltage rating. Thus, in the voltage detector 55, a single Zener diode 63 of relatively high voltage rating, although more than one diode of lower voltage rating may be used, is connected in the arm of the bridge between terminals 52 and 57, and in the opposed or non-adjacent arm between terminals 53 and 58, there is connected a temperature compensating element indicated as a thermistor 65 having a negative temperature coefficient of resistance. The thermistor 65 has a temperature resistance characteristic such that the voltage drop thereacross varies with temperature in a manner similar to the voltage drop across the Zener diode 63 but in the opposite sense. Suitable temperature resistance characteristics may be obtained by a proper choice of thermistor and a resistor shunting the thermistor such as resistor 66. Thus, any variation in the voltage drop across Zener diode 63 due to temperature variations will be compensated for by like variations in the opposite sense in the voltage drop across the thermistor 65. Thus, for all intents and purposes the voltage drop across Zener diode 63 remains constant and will be so considered hereinafter.

A fixed resistor 67 is connected in the arm between terminals 53 and 57; and connected in the arm between terminals 52 and 58 is a fixed resistor 68 in series with a variable portion of a potentiometer 69 having its movable contact connected to the terminal 58. Connected in series with thermistor 65 is a resistor 70 and another variable portion of potentiometer 69. The potentiometer 69 provides an adjustment for pre-balancing the detector bridge for a predeterminned value of load voltage and serves as line level control means for selecting the value at which the load voltage is to be maintained substantially constant.

The effective values of resistance in the arms of the bridge are so chosen that when a D.C. voltage of predetermined value (corresponding to the desired normal load voltage value) is impressed across the input terminals 52 and 53, the detector bridge 55 is balanced and the output voltage or "error" signal voltage across the output terminals 57 and 58 of the detector bridge is zero. If the voltage across the input terminals 52 and 53 increases above that predetermined value, the bridge detector is unbalanced in one sense, and the detector output or error signal voltage will be of a given polarity which will be considered herein for convenience as a signal voltage of "positive" polarity, the output terminal 57 being positive relative to the output terminal 58. On the other hand, if the voltage impressed across the input terminals 52 and 53 decreases below that predetermined value, the bridge detector is unbalanced in the opposite sense to provide an error signal voltage at the output of the detector of opposite polarity, and which will be considered herein as a signal of "negative" polarity since the terminal 58 will be positive relative to terminal 57. The function and operation of the detector will be described in greater detail hereinafter.

The output terminals 57 and 58 of the voltage sensing circuit are respectively connected by leads 72 and 73 to input terminals 74 and 75, respectively, of the switching circuit 42. The circuit 42 is a polarity sensitive static switching network including a first current controlled static switching circuit, indicated generally at 77, that is responsive to signal voltages from the detector 55 of negative polarity, and a second static current controlled switching circuit 78 responsive to signal voltages of opposite or positive polarity. The switching circuit 77 and 78 are similar, and each is shown as a two-stage transistor amplifier switching circuit arranged to have positive or regenerative feedback so as to provide positive switching or exhibit "on" and "off" characteristics. Switching circuit 77, which is connected to operate motor relay 26, includes a normally "on" or forwardly biased transistor 80 and a normally "off" or reversely biased transistor 81. The switching circuit 78 which is adapted to operate motor relay 27 includes a normally "on" or forwardly biased transistor 82 and a normally "off" or reversely biased transistor 83. These transistors are of the PNP type, however, with minor obvious circuit changes, NPN type transistors could be used, as is well known to those skilled in the art. Any suitable source of D.C. supply voltage for circuit 42 may be used, and such a source is shown simply in block form at 84 connected to a pair of D.C. supply terminals 87 and 88.

Transistor 80 of switching circuit 77 has an input circuit including its input electrode, base 80b, connected to the signal input terminal 75, and its common electrode, emitter 80e, connected to the positive supply terminal 87. The output circuit of transistor 80 includes the emitter 80e and its output electrode, collector 80c, which is connected to the negative supply terminal 88 through a load resistor 92. The bias circuit of transistor 80 includes series connected resistors 93 and 94 between base 80b and the negative supply terminal 88. The transistor 81, which is connected to be responsive to the output of transistor 80, has its base 81b connected to the collector 80c, its emitter 81e connected through a one-way valve or diode 96 to the positive D.C. supply terminal 87, and its collector 81c connected to the negative supply terminal through a load resistor 97. Regenerative feedback, as will be explained in greater detail hereinafter, is provided between the two transistor stages by means of a feedback path including a current limiting resistor 98 in series with a diode 99 connected between the collector of transistor 81 and the junction between bias resistors 93 and 94 of transistor 80.

The collector 81c is also connected to one end of coil 30 of motor relay 26 through a lead 100 having a one-way rectifier or diode 101 connected therein. The other end of coil 30 is connected by a lead 102 through time delay circuit 44 to the negative terminal 88 of the D.C. supply source. The input circuit of transistor 81 is thus coupled to the output circuit of transistor 80 to be responsive thereto, and its output circuit is connected to supply current to relay coil 30, which current also flows in the delay network 44.

The transistors 82 and 83 of switching circuit 78 are connected and arranged in the same manner as the transistors of circuit 77 except that the base 82b of transistor 82 is connected to the signal input terminal 74, and the collector 83c of transistor 83 is connected to one end of coil 34 of motor relay 27 through a lead 103 having a diode 104 connected therein. The other end of coil 34 is connected by lead 102 through the time delay circuit 44. The bias circuit of transistor 82 includes series connected resistors 105 and 106 between the base 82b and the negative supply terminal 88. The emitter 82e is connected to the positive supply terminal 87 and the collector 82c is connected through a load resistor 107 to the negative side of the supply source. Collector 82c is also connected to the base 83b of transistor 83. The emitter 83e is connected to the positive side of the D.C. supply source through the diode 96, and the collector 83c is connected to the negative side of the supply source through a load resistor 108. The regenerative feedback in circuit 78 is provided for by a resistor 109 in series with a diode 110 connected between the collector 83c and the common junction point of resistors 105 and 106. Transistor 83 has its input circuit coupled to the output circuit of transistor 82 to be responsive thereto, and its output circuit is connected to supply current to relay coil 34, which current also flows through delay network 44.

The static switching network 42 thus has an input circuit, including input terminals 74 and 75, common to both of its switching circuits 77 and 78, the input circuits of input transistors 80 and 82 being connected in series with each other between the terminals 74 and 75. The network 42 has a pair of output circuits, including output transistors 81 and 83, one connected to supply output current to relay coil 30 and the delay network 44, and the other connected to supply output current to relay coil 34 and the delay network 44.

In voltage regulating apparatus of the type shown in the drawing for illustration, the load voltage is permitted to vary, above and below the desired normal value, within relatively small limits without the apparatus making a tap change, and the range of values between these limits is often referred to as "band width." Usually it is desired to provide means for varying the band width of a system, and this is provided for in the present system by an adjustable resistance circuit 112 connected in the bias circuits of transistors 80 and 82 for simultaneously adjusting the bias thereof to provide a system band width control. The circuit 112 includes voltage dividing resistors 114 and 115 connected in series with each other between the bases 80b and 82b. A bias selector or band width control switch 116 has a movable contact 117 connected to the negative side of the D.C. supply source and which is selectively engageable with three fixed contacts 118, 119 and 120. The contact 118 is not connected in the circuit and, when engaged by movable contact 117, serves to open the adjustable resistance circuit 112, and a predetermined minimum value of bias current (emitter to base) flows in each of the transistors 80 and 82 as determined by the value of the biasing resistors for each of these transistors. A resistor 122 is connected between fixed contact 119 and the common junction of the voltage dividing resistors 114 and 115 so that when movable contact 117 is in engagement with contact 119, resistor 122 is connected in a series circuit with each of the voltage dividing resistors and in shunt relation with the biasing resistors of each of the transistors 80 and 82. Thus, when contacts 117 and 119 are in engagement, the bias current flowing in these transistors is greater than the above-mentioned predetermined value. If the movable contact 117 is moved into engagement with contact 120, the bias current for transistors will be further increased since the contact 120 is connected directly to the common junction of the voltage dividing resistors and provides a means for bypassing resistor 122 in the bias shunting circuit. In this way, the position of bias adjusting switch 116 determines the magnitude of error signal necessary to trip either of transistors 80 or 82 and therefore the system band width.

A pair of reversely poled one-way diodes 125 and 126 are connected across the input circuit terminals 74 and 75 to limit the magnitude of the signal voltage to a predetermined maximum value and prevent the possibility of any surge voltages across the input circuits of transistors 80 and 82. With this arrangement, the signal voltage is limited to the forward drop across either of the diodes 125 or 126.

In the absence of an error signal across the input terminals 74 and 75 of the switching circuit 42, the emitter to base bias currents of input transistors 80 and 82 are sufficient to maintain these transistors highly conductive or such that their emitter to rollector currents are high and their emitter to collector impedances are low. With the base of transistor 81 connected to the collector of transistor 80 and the base of transistor 83 connected to the collector of transistor 82, the emitter to collector potentials of transistors 80 and 82, which are the control voltages for transistors 81 and 83, respectively, are very low because of the low impedances of transistors 80 and 82, and the transistors 81 and 83 are normally non-conductive or have high emitter to collector impedances under these conditions. The diode 96 will provide a relatively small forward voltage drop thereacross which will insure that the emitters of the output transistors 81 and 83 remain negative relative to their associated bases, that is, reversely biased, and the output transistors therefore normally non-conductive when the input transistors 80 and 82 are in their normally conductive condition with no actuating error signal present.

If it is assumed that a positive error signal is applied to the signal input terminals (terminal 74 positive relative to terminal 75) a signal voltage current component will flow in opposition to the bias current of transistor 82 and in aiding relation with the bias current of transistor 80. Transistor 80 will not be tripped by the positive signal since a positive signal will be in aiding relation to its bias and tend to even further increase the output thereof. If the signal voltage is of sufficient magnitude, the output of transistor 82 will decrease and its impedances will increase so that the emitter to base potential of transistor 83 will increase and the transistor 83 will become conductive. The feedback from collector 83c, which flows through resistor 109, diode 110 in its forward direction, and resistor 106, increases the potential at the junction of resistors 105 and 106 to decrease the bias current of transistor 82 and further increase the emitter to collector impedance thereof. The increased impedance of transistor 82 further increases the control voltage between the emitter and base of transistor 83 to thereby further increase the output current thereof. The increased output of transistor 83 effects a still further increase in the impedance of transistor 82 which, in turn, causes a still further increase in the output of transistor 83. This feedback action continues until the transistor 82 becomes non-conductive or a high impedance and transistor 83 becomes highly conductive or a low impedance. With this feedback arrangement, the transistors of switching circuit 78 are quickly triggered to provide "on" and "off" switching action. These transistors will remain in their respective tripped conditions as long as a positive signal voltage of sufficient magnitude remains at the input of transistor 82.

If a negative error signal of sufficient magnitude is applied to the signal input terminals (terminal 75 positive relative to terminal 74) transistor 80 will become nonconductive or a high impedance and the transistor 81 will become conductive or a low impedance while the negative signal will not trigger transistor 82 but will aid the bias and tend to even further increase the output of transistor 82. With the feedback circuit, including resistor 98 and diode 99, the transistor 80 will be quickly trigged to an "off" or non-conductive condition while transistor 81 will be switched "on" or triggered to a highly conductive condition in response to a negative signal of sufficient magnitude. The operation of switching circuit 77 is similar to the above described operation of switching circuit 78 except that transistors 80 and 81 are triggered in response to negative error signals and transistors 82 and 83 are triggered in response to positive signals.

In order to return either input transistor to its normally "on" state after it has been tripped, the signal voltage must decrease to a value below the value necessary to trip the transistor. This is because the above-mentioned positive feedback arrangement has the additional effect of raising the voltage on the base of the input transistor once it has been triggered. Thus, once a transistor has been tripped, the signal voltage must decrease a predetermined amount below the tripping value before the transistor will be returned to its normally "on" state. This has the effect of preventing "hunting" or operation of the switching network in response to minor disturbances or minor changes of a transient nature in the signal voltage. The signal voltage value at which an input transistor will be returned to its normally "on" state may be adjusted within limits by varying the values of the resistors 98 and 109 in the two feedback circuits.

The time delay network 44 is connected in series with each of the motor relay coils 30 and 34 to delay the energization of either relay, and therefore motor 16, for a predetermined time after one of the switching circuits 77 or 78 has been triggered in response to an error signal.

The delay network 44 includes a time constant circuit having an adjustable charging resistance circuit 130 and a capacitor 132 which, in the illustrated embodiment, are connected in series between one end of each relay coil and the negative side of the D.C. supply source 84. Resistance circuit 130 is shown including four series connected resistors 134, 135, 136 and 137 and a charging time selector switch 138 having a movable contact which is connected to one side of capacitor 132 and is selectively engageable with a plurality of stationary contacts of the switch. The stationary contacts of switch 138 are connected to different points along the series string of resistors. The free end resistor 134 is connected to lead 102 at a circuit point 140. Connected in parallel circuit relation with the capacitor charging circuit between the circuit point 140 and the negative side of the D.C. supply source is a resistor 145. The resistance values of resistors in circuit 130 and the resistance of resistor 145 are chosen such that the sum of the capacitor charging current and the current through resistor 145 is of relatively low value compared to the value of current required to energize or actuate either of the motor relays.

Connected in parallel circuit relation with the resistor 145 and in series with the relay coils 30 and 34 is a controlled "shorting" circuit adapted to short-out or by-pass the resistor 145 when the charge on capacitor 132 has reached a predetermined value. This shorting or by-passing circuit includes a static switching device shown as a controlled silicon controlled rectifier indicated as a well-known three electrode silicon controlled rectifier 147. The controlled rectifier has its anode 147a connected to one side of resistor 145 and the circuit point 140, and its cathode 147c connected to the other side of resistor 145 and to the negative side of the D.C. supply source.

The silicon controlled rectifier 147 exhibits a high anode to cathode impedance in the absence of an actuating control voltage between its gate electrode 147g and its cathode 147c; but the rectifier has a very low anode to cathode impedance when a control voltage of predetermined value is applied between the gate and cathode electrodes. Also, once the silicon controlled rectifier is actuated and becomes conductive, it remains conductive until the anode to cathode current ceases to flow regardless of the value of control voltage applied thereto.

In the delay network 44, the silicon controlled rectifier 147 is controlled in response to the charge on capacitor 132 by means of a voltage responsive static switching device indicated as a unijunction transistor 150. The unijunction transistor is arranged to fire when the capacitor is charged to a predetermined voltage value and is connected to effect firing of silicon controlled rectifier 147. Unijunction transistor 150 has its emitter E connected to the positive side of capacitor 132 at a circuit point 152, its base one, $B_1$, connected through a load resistor 154 to the negative side of the D.C. supply source, and its base two, $B_2$, connected through a resistor 156, a potentiometer 158, and a switch 159 to the positive side of the D.C. supply source. The function of switch 159 will be described hereinafter. Another resistor 160 has one end connected to one end of potentiometer 158 and the other end to the negative side of the supply source. The resistor 160 and the potentiometer 158 form a voltage divider for preadjusting the voltage on the base two, $B_2$, of unijunction transistor 150. The resistor 156 serves as temperature compensating means for the unijunction transistor in that, as the impedance from base $B_1$ to $B_2$ varies with temperature, the drop across resistor 156 will vary to maintain the correct stand-off ratio.

The impedance between the emitter E and base one, $B_1$, is high in the absence of an actuating voltage therebetween, but is rapidly decreased when the voltage between these electrodes, E and $B_1$, reaches a predetermined percentage of the voltage between the base one, $B_1$, and base two, $B_2$. Thus, with the emitter and base one in the main discharge path of the capacitor, little or no current will flow through unijunction transistor 150 until the voltage on capacitor 132 reaches the predetermined value at which the unijunction transistor fires, and then the emitter E to base $B_1$ impedance will decrease to a low value whereby the capacitor discharges through the load resistor 154.

As seen in the drawing, the load resistor 154 is connected between the cathode and gate of the silicon controlled rectifier 147 so that when the capacitor discharges through the unijunction transistor 150, the discharge current produces a "spike" of voltage across the resistor 154 which is sufficient to actuate or fire the controlled rectifier 147. A resistor 162 is connected in series with the gate 147g to limit the gate to cathode current to a safe value.

By moving the movable contact of switch 138 to the right, as viewed in the drawing, the charging time resistance is increased so as to increase the time required to charge the capacitor to the voltage necessary to fire the unijunction transistor 150 and controlled rectifier 147. Movement of the movable contact to the left, of course, decreases the charging time resistance and decreases the time required to charge the capacitor to the voltage value required to fire the unijunction transistor and controlled rectifier. The potentiometer 158 and resistor 160 provide convenient means for compensating for the usual manufacturing tolerances or slight variations from the rated values of the circuit components in the timing circuit. Any variations from the rated values of the time resistors 134 to 137 and the capacitor 132 would change the time required to charge the capacitor to the voltage value necessary to trip the unijunction transistor, however, by adjusting the voltage on base $B_2$ by means of potentiometer 158, the value of the capacitor voltage necessary to trip the transistor 150 can be changed to thereby compensate for such circuit component tolerances to obtain the desired time to charge the capacitor 132.

When one of the switching circuits 77 or 78 is tripped by an error signal, capacitor charging current will flow from the positive side of the D.C. supply source through rectifier 96, the output transistor of the tripped switching circuit, the associated motor relay coil to point 140 and then to capacitor 132 through one or more of the timing resistors to effect charging of the capacitor. Very little current will flow through resistor 145. If the error signal persists a time long enough to permit the charge on capacitor 132 to reach its critical value necessary to trip unijunction transistor 150, the capacitor will discharge through load resistor 154 to trip controlled rectifier 147. The anode to cathode impedance of the controlled rectifier will then be reduced to a very low value to thereby essentially short out resistor 145. As soon as resistor 145 is shorted, the current flowing in the relay coil will increase to a value sufficient to actuate the relay contacts and turn the motor 16 on. The motor will then effect a tap change in a direction tending to correct the load voltage or compensate for the change in the load voltage causing the error signal. The controlled rectifier 147 will remain "on" and the energized relay closed until the tripped switching circuit is returned to its untripped condition. Once the silicon controlled rectifier conducts, it remains conductive until its anode to cathode current stops and this provides positive latching action for holding the motor relay closed or latched in. The capacitor will be fully discharged and remain in its discharged state until after the tripped switching circuit is untripped and either of the switching circuits is again tripped. Because the capacitor is fully discharged after the unijunction 150 fires, the time delay network is automatically reset to provide the preselected time delay desired for a subsequent switching operation.

Should an error signal at input terminals 74 and 75 trip either of the switching circuits and then fall below the value necessary to maintain the switching circuit tripped before the capacitor has charged to the critical value necessary for tripping unijunction transistor 150, the capacitor charging current will cease as the tripped switching circuit returns to its untripped condition, and the capacitor will start discharging without effecting actuation of a motor relay. This discharge current will flow from one side of the capacitor to circuit point 152, through a series circuit including a current limiting resistor 170 and a one-way valve or rectifier 172 connected in parallel relation with the timing resistors, and through resistor 145 to the other side of the capacitor. Rectifier 172 is poled to prevent capacitor charging current from flowing through resistor 170. The discharge time is primarily determined by the value of resistor 145 in this capacitor discharge path. If no subsequent actuating error signal occurs for the preselected capacitor discharge time, the capacitor will become fully discharged and the delay circuit will be reset to provide the preselected time delay when the next error signal occurs as a result of the load voltage varying above or below the predetermined limits of the band width range of values. This prevents short time load voltage surges or excursions out of the band width range, where the time between such surges is relatively great, from effecting the energization of a motor relay and a tap change.

On the other hand, with a suitable preselected discharge time, a series of short time excursions of load voltage out of the band width range of values, if the time between excursions is relatively short, can eventually cause the capacitor to become charged to the critical value at which the unijujnction transistor 150 and controlled rectifier 147 will be tripped to effect a tap change, even though the length of time that the load voltage is out of the band width range during each excursion is less than the predetermined delay time. This is because capacitor 132, under these conditions, will not fully discharge between such successive load voltage excursions, and the capacitor voltage will continue to increase in response to such continued load voltage excursions until it reaches the critical value necessary to cause a tap change. Thus, by providing the present delay network with a second suitable capacitor discharge circuit provided by resistors 145, 170 and rectifier 172, certain short time undesirable voltage excursions out of the band width range of values which produce short time error signals will eventually result in a tap change so as to limit such excursions to values within the permissible band width range of values or maintain the average value of the load voltage within the band width range. Thus the delay network 40 provides a time integrating effect, that is, it has the effect of integrating the time that the load voltage is out of the band width range of values, so as to effect the energization of a motor relay in response to the average value of the load voltage.

In operation, when the load voltage is at its predetermined desired value, the direct current voltage impressed between the input terminals 52 and 53 of the detector bridge 55 will be at the predetermined value at which the bridge will be balanced to thus provide a zero error signal at its output terminals 57 and 58 and at the input terminals 74 and 75 of switching circuit 42. With the bridge 55 supplying a zero error signal across the input terminals of the switching circuit 42, input transistors 80 and 82 will be highly conductive and the output transistors 81 and 83 will be non-conductive. The effective impedance in series with each of the motor relay coils 30 and 34 will thus be very high since the emitter to collector of each of the transistors 81 and 83 will be high, as will be the impedance of the time delay network 44, whereby the motor relay coils and the motor 16 will be maintained unenergized. Small permissible variations in the load voltage will produce small error signals at the bridge output but will not trip either of the switching circuits 77 or 78 if such variations are within the band width range of values as determined by the band width control or bias adjusting switch 116, as was previously discussed herein.

Should the load voltage, for example, decrease to a value below the predetermined permissible value, that is, fall below the lower limit of the band width range of values, the alternating current voltage across the A.C. terminals of rectifier 47 and the direct current voltage across the input terminals 52 and 53 of the bridge 55 will decrease. With the detector input voltage at a value less than the voltage at which the bridge 55 is balanced, the voltage drop across the bridge arm containing resistor 68 will be less than the voltage drop across the arm containing Zener diode 63 since the voltage drop across the Zener diode remains constant. The detector bridge will be unbalanced and the output terminal 58 will thus be positive relative to output terminal 57 to provide a negative signal to the input terminals 74 and 75 of switching circuit 42. With a negative signal applied to the base emitter circuit of transistor 80, transistor 80 will become non-conductive, transistor 81 conductive, and current, which is of insufficient value to actuate relay 30, will flow from the positive side of the D.C. supply source, 87-88, through the relay coil 30 and charging resistance circuit 130 to charge capacitor 132, as previously described herein. Capacitor 132 will charge at a rate determined by the predetermined time constant of the circuit which may be preadjusted by switch 138. Assuming the negative signal applied to the input of switching circuit 42 persists long enough to permit the voltage on the capacitor to rise to the critical value necessary to fire unijunction transistor 150, or a time equal to the predetermined delay time, the capacitor will discharge through the unijunction transistor E to $B_1$ and load resistor 154. The rise in voltage across resistor 154 will actuate or fire controlled rectifier 147. As soon as rectifier 147 becomes conductive, a relatively high value of current will flow through relay coil 30 and through the controlled rectifier, anode to cathode, to the negative side of the D.C. supply source to actuate relay 30. Contacts 28 and 29 of relay 26 will close and the motor 16 will be energized to move the tap selector contacts 9 to their next position. For example, as viewed in the illustrated system shown in the drawing, the motor 16 will drive contacts 9 in a clockwise direction to make one or more tap changes which will increase the distribution circuit voltage. The motor will remain on until the load voltage is returned to a value which is within the band width range of values. As soon as the load voltage is within the band width range, the detector output, which is responsive to changes in the load voltage, will decrease and the switching circuit 77 will return to its normal or untripped condition so as to deenergize relay coil 30 and motor 16.

The operation of the system in returning the load voltage to within the band width range after it has increased to a value above the upper limit of the band width range is similar to the operation described above except that switching circuit 78 and relay 27 are actuated to drive the motor 16 and tap selector contacts 9 in the opposite direction to reduce the distribution voltage. For example, upon an increase in load voltage to a value above the upper limit of the band width range, the D.C. detector input voltage will increase above the value at which the detector bridge 55 is balanced. The voltage drop across the bridge arm containing resistor 68 will be greater than the constant voltage drop across the arm containing Zener diode 63 so that the bridge will be unbalanced in a direction to provide a positive error signal at the input terminals of switching circuit 42 (terminal 57 positive relative to terminal 58). With a positive error signal applied to the base emitter circuit of transistor 82, this transistor will become non-conductive and transistor 83 highly conductive so that capacitor 132 will begin charging through relay coil 34. Assuming that the positive signal persists for a time equal to or greater than the predetermined delay time of the delay network, the capacitor voltage will reach the critical value necessary to trip unijunction transistor 150 so that the capacitor will discharge through load resistor 154 to provide the actuating signal thereacros for firing controlled rectifier 147. As soon as rectifier 147 becomes conductive, a relatively high value of current will flow through relay coil 34 and the anode-cathode circuit of the controlled rectifier to the negative side of the D.C. supply source. This current flow will be of a relatively high value and will effect actuation of relay 27 so that motor 16 will be energized to drive tap selector movable contacts 9 in a counterclockwise direction, as viewed in the drawing. The motor will remain energized to effect one or more tap changes to decrease the distribution circuit voltage until the load voltage is returned to a value which is within the band width range of values. Once the load voltage is within the band width range, the detector output will decrease to zero or to a low value so as to return the switching circuit 78 to its untripped condition whereby the relay 27 and motor 16 will be de-energized.

As previously mentioned herein, should the load voltage return to a value within the band width range before the capacitor 132 has reached the critical value required to effect current conduction between emitter E and base $B_1$ of the unijunction transistor 150, the tripped switching circuit will revert to its normally untripped condition and the capacitor will start discharging through its second discharge path which includes resistors 145 and 170, and diode 172. The motor in such case will, of course, not be energized. In this way, certain minor fluctuations will not effect tap changes as is desirable. However, because of the time integration effect, should a sufficient number of short time voltage variations in and out of the band width range occur, and the time between such variations be less than the predetermined discharge time of the capacitor 132, the capacitor will eventually charge up to the critical value at which the delay network will desirably effect energization of one of the relay coils to effect one or more tap changes, as previously described herein.

In some applications it may be desirable to operate a control system with a fixed time delay under all operating conditions. In other words, it may be desired in some cases to eliminate the above-mentioned time integrating feature of the delay network 44 so that load voltage disturbances of a transient nature or short time load voltage variations in and out of the band width range of values do not effect a tap change. Where such a fixed delay time is desired or required, the switch 159 is moved from the position shown in the drawing to its other position whereby the movable arm of potentiometer 158 is directly connected to the lead 102. With this connection, the operating supply voltage for unijunction transistor 150 will only be applied when either of the switching circuits 77 or 78 is tripped, and the voltage will be removed when the tripped switching circuit is returned to its untripped condition. Whenever the voltage is removed from the base $B_2$ of the unijunction transistor, the impedance from emitter E to base $B_1$ becomes very low. Thus, if an error signal trips one of the switching circuits, the capacitor will start charging, but should the error signal drop below the value necessary to maintain the switching circuit tripped before the delay network has timed out, i.e., before the capacitor effects the firing of the unijunction transistor, the voltage on the base $B_2$ will be reduced or removed and the capacitor will quickly discharge through the unijunction transistor. This will provide the system with a fixed delay time so the load voltage must remain out of the band width range for at least the preselected delay time before a tap change can be made.

The circuit components of the system shown and described herein, including resistors, transistors, diodes, the capacitor, the silicon controlled rectifier, etc., will, of course, be designed in accordance with well-known practice to have suitable values and ratings for the functions they are to perform.

In the system shown and described herein, solid state circuit components are employed in the sensing circuit 40, switching network 42, and time delay network 44. By employing solid state or semi-conductor devices, such as the transistors, unijunction transistor, and silicon controlled rectifier, described herein, the apparatus will be of light weight, not readily subject to damage or mechanical failure, and is relatively simple and economical, as well as very reliable in operation. The rectifiers or diodes used in the system may also be of the semi-conductor type. Also, only one time delay network 44 need be used, as the same circuit components of the delay network are operative in delaying the selective energization of both motor control relays.

The control system controls the operation of the motor operating device 25 to perform one function or another. In the illustrated embodiment, device 25 effects operation of motor 16 in one direction or the other to drive contact 9 in one direction or the other. However, instead of employing contact making motor operating device 25, static control means, well known in the art, can be used if so desired. For example, a transistor or magnetic amplifier circuit could be used to control the operation of motor 16, or other electric device, in response to the output of switching network 42.

While the static switching circuits 42 and the delay network 44 have been described and shown herein in connection with voltage regulating apparatus, it will be apparent to those skilled in the art that these circuits can be useful in other types of systems and in connection with apparatus other than that shown for illustration in the drawing.

It is to be understood that the foregoing description and accompanying drawing have been given only by way of illustration and example, and that many changes and alterations in the present disclosure, which will be apparent to one skilled in the art, are contemplated as within the scope of the present invention which is limited only by the claims which follow.

The embodiments of the invention in which an exclusive property or privilege is claimed are defined as follows:

1. A time delay circuit for controlling the energization of an electric device in response to control signals which are applied to the time delay circuit for varying lengths of time comprising means including switching means connected with said electric device to effect energization thereof when actuated, a time constant circuit including energy storage means charged in response to the application of said signals to said time delay circuit, discharge circuit means coupled to said energy storage means for effecting the discharge thereof when said energy storage means is charged to a predetermined value, means coupled to said discharge circuit means and said switching means to effect actuation of said switching means in response to the discharge of said energy storage means, and other discharge circuit means coupled with said energy storage means providing a predetermined rate of discharge for said energy storage means upon the cessation of a signal applied to said time delay circuit for a time less than that required to charge said energy storage means to said predetermined value.

2. A time delay circuit for controlling the energization of an electric device in response to control signals which are applied to the time delay circuit for varying lengths of time comprising means including switching means connected with said electric device to effect energization thereof when actuated, a time constant circuit including impedance means and energy storage means connected in series therewith and charged in response to the application of said signals to said time delay circuit, discharge circuit means coupled to said energy storage means for effecting the discharge thereof when said energy storage means is charged to a predetermined value, means coupled to said discharge circuit means and said switching means to effect actuation of said switching means in response to the discharge of said energy storage means, and other discharge circuit means coupled with said energy storage means providing a predetermined rate of discharge for said energy storage means upon the cessation of a signal applied to said time delay circuit for a time less than that required to charge said energy storage means to said predetermined value, said other discharge circuit means including one-way valve means connected in by-pass relation with said impedance means and poled to oppose the flow of charging current to storage means.

3. A time delay circuit for controlling the energization of an electric device in response to control voltage signals which are applied to the time delay circuit for varying lengths of time comprising a pair of circuit terminals adapted to have said signals applied thereacross, means for energizing said electric device including switching means connected in series with said electric device to effect energization thereof when said switching means is conductive, said switching means having control means for effecting conduction thereof, a time constant circuit including first impedance means and energy storage means connected in series relation between said terminals whereby said energy storage means is charged in response to the application of said signals to said terminals, discharge circuit means coupled to said storage means for discharging said storage means when said storage means is charged to a predetermined value, means coupling said control means to said discharge circuit means to effect conduction of said switching means and energization of said electric device in response to the discharge of said storage means, and other discharge circuit means providing a predetermined rate of discharge for said energy storage means upon the cessation of a control signal applied to said terminals for a time less than that required to charge said energy storage means to said predetermined value, said other discharge circuit means including one-way valve means connected in a circuit between one of said terminals and one side of said storage means and poled to oppose the flow of charging current to said storage means, and second impedance means connected in a circuit between said one terminal and the other side of said storage means.

4. A time delay circuit for controlling the energization of an electric device in response to control voltage signals which are applied to the time delay circuit for varying lengths of time comprising a pair of circuit terminals adapted to have said signals applied thereacross, means including switching means connected in series with said electric device to effect energization thereof when actuated, a time constant circuit including first impedance means and capacitance means connected in series relation between said terminals whereby said capacitance means is charged in response to the application of said signals to said terminals, discharge circuit means coupled to said capacitance means for discharging said capacitance means when said capacitance means is charged to a predetermined value, means coupled to said discharge circuit means and said switching means to effect actuation of said switching means in response to the discharge of said storage means through said discharge circuit means, and other discharge circuit means providing a predetermined rate of discharge for said capacitance means upon the cessation of a control signal applied to said terminals for a time less than that required to charge said capacitance means to said predetermined value, said other discharge circuit means including one-way valve means coupled to said capacitance means in by-pass relation with said first impedance means and poled to oppose the flow of charging current to said capacitance means, and second impedance means connected between said terminals in parallel circuit relation with said time constant circuit.

5. A time delay circuit for controlling the energization of an electric device in response to control voltages which are applied to the time delay circuit for varying lengths of time comprising a pair of circuit terminals adapted to have said control voltages applied thereacross, means for energizing said electric device including static switching means connected in series with said electric device between said terminals to effect energization thereof when said switching means is conductive, said switching means having control means for effecting conduction thereof, a time constant circuit including first impedance means and capacitance means connected in series relation with each other between said terminals whereby said capacitance means is charged in response to the application of said control voltages to said terminals, discharge circuit means including voltage responsive static switch means coupled to said capacitance means for discharging said capacitance means therethrough when said capacitance means is charged to a predetermined voltage value, means coupling said control means to said discharge circuit means to effect conduction of said switching means and energization of said electric device in response to the discharge of said capacitance means through said static switch means, and other discharge circuit means providing a predetermined rate of discharge of said capacitance means upon the cessation of a control voltage applied to said terminals for a time less than that required to charge said capacitance means to said predetermined voltage value, said other discharge circuit means including one-way valve means connected in a circuit between one of said terminals and one side of said capacitance means and poled to oppose the flow of charging current to said capacitance means, and second impedance means connected in a circuit between said one terminal and the other side of said capacitance means.

6. A time delay circuit for controlling the energization of an electric device in response to direct current control voltages which are applied to the time delay circuit for varying lengths of time comprising a pair of circuit terminals adapted to have said control voltages applied thereacross, means for energizing said electric device including normally non-conductive solid state switching means connected in series with said electric device between said terminals to effect energization thereof when said switching means is conductive and a control voltage is applied to said terminals, said switching means having control means for effecting conduction thereof, a time constant circuit including resistance means and capacitance means connected in series relation with each other between said terminals whereby said capacitance means is charged through said resistance means in response to the application of said control voltages to said terminals, discharge circuit means including a normally non-conductive unijunction transistor and impedance means connected in series circuit relation with each other across said capacitance means, said unijunction transistor being fired into conduction to discharge said capacitance means through said impedance means when said capacitance means is charged to a predetermined voltage value, means coupling said control means to said impedance means to effect conduction of said switching means and energization of said electric device in response to the discharge of said capacitance means through said impedance means, and other discharge circuit means providing a predetermined rate of discharge for said capacitance means upon the cessation of a control voltage applied to said time delay circuit for a time less than that required to charge said capacitance means to said predetermined value, said other discharge circuit means including one-way valve means connected in a circuit between one of said terminals and one side of said capacitance means and poled to oppose current flow to said capacitance means when said capacitance means is charging, and second impedance means connected in a circuit between said one terminal and the other side of said capacitance means.

7. A time delay circuit for controlling the energization of an electric device in response to direct current control voltages which are applied from power supply means to the time delay circuit for varying lengths of time comprising a pair of circuit terminals adapted to have said control voltages applied thereacross, a normally non-conductive silicon controlled rectifier having anode, cathode and gate electrodes, means coupling said electric device in series relation with said anode and cathode electrodes between said pair of terminals to effect energization of said electric device when said rectifier is fired into conduction, a time constant circuit including resistance means and capacitance means connected in series relation with each other between said terminals whereby said capacitance means is charged through said resistance means in response to the application of said control voltages to said terminals, discharge circuit means for said capacitance means including a unijunction transistor having an emitter electrode and a pair of base electrodes, means coupling said emitter electrode to one side of said capacitance means, impedance means connected between one of said base electrodes and the other side of said capacitance means, and circuit means coupled to said supply means for providing a voltage across said base electrodes to normally maintain said unijunction transistor non-conductive, said unijunction transistor being fired into conduction to discharge said capacitance means through said impedance means when said capacitance means is charged to a predetermined voltage value, means coupling said gate and cathode electrodes to said impedance means to effect firing of said rectifier in response to the discharge of said capacitance means through said impedance means, and other discharge circuit means providing a predetermined rate of discharge for said capacitance means upon the cessation of a control voltage applied to said time delay circuit for a time less than that required to charge said capacitance means to said predetermined value, said other discharge circuit means including one-way valve means connected in parallel circuit relation with said resistance means and in series relation with said capacitance means between said terminals, and other resistance means connected in parallel circuit relation with said time constant circuit.

References Cited by the Examiner
UNITED STATES PATENTS

| | | |
|---|---|---|
| 2,925,548 | 2/1960 | Scherer. |
| 3,018,432 | 1/1962 | Palmer. |
| 3,047,789 | 7/1962 | Lowry _____ 320—1 X |
| 3,131,318 | 4/1964 | Synder et al. |
| 3,160,805 | 12/1964 | Lawson. |
| 3,177,418 | 4/1965 | Meng _____ 323—22 X |
| 3,195,029 | 7/1965 | Gilbreath _____ 323—22 X |

OTHER REFERENCES

Notes on the Application of the Silicon Controlled Rectifier, Semiconductor Products Department, General Electric Co., December 1958, pp. 30–35.

ORIS L. RADER, *Primary Examiner.*

W. M. SHOOP, *Assistant Examiner.*